United States Patent
Mesiti

(10) Patent No.: US 11,719,274 B2
(45) Date of Patent: *Aug. 8, 2023

(54) LOCK NUT SYSTEMS AND METHODS

(71) Applicant: TEMPER AXLE PRODUCTS CORPORATION, Fonda, NY (US)

(72) Inventor: Nicholas Mesiti, Slingerlands, NY (US)

(73) Assignee: TEMPER AXLE PRODUCTS CORPORATION, Fonda, NY (US)

( * ) Notice: Subject to any disclaimer, the term of this patent is extended or adjusted under 35 U.S.C. 154(b) by 135 days.

This patent is subject to a terminal disclaimer.

(21) Appl. No.: 17/215,642

(22) Filed: Mar. 29, 2021

(65) Prior Publication Data

US 2021/0215190 A1 Jul. 15, 2021

Related U.S. Application Data

(63) Continuation of application No. 16/025,293, filed on Jul. 2, 2018, now Pat. No. 10,968,945.

(51) Int. Cl.
*F16B 39/22* (2006.01)
*F16B 39/12* (2006.01)
*F16B 39/10* (2006.01)

(52) U.S. Cl.
CPC ............ *F16B 39/12* (2013.01); *F16B 39/103* (2013.01)

(58) Field of Classification Search
CPC .......... F16B 39/24; F16B 39/26; F16B 39/28; F16B 39/282; F16B 39/34
USPC ........ 411/202, 210, 211, 217, 221, 315–317, 411/332
See application file for complete search history.

(56) References Cited

U.S. PATENT DOCUMENTS

| 518,328 A | 4/1894 | Oakey |
| 578,276 A | 3/1897 | Strauss |
| 1,352,643 A * | 9/1920 | Young ..................... F16B 39/10 411/926 |
| 1,359,299 A | 11/1920 | Wagner |
| 1,366,273 A | 1/1921 | Nettlefold |
| 1,373,489 A | 4/1921 | Cochran |
| 1,384,655 A | 7/1921 | Allmon |
| 1,440,938 A | 1/1923 | Steroslawski |

(Continued)

FOREIGN PATENT DOCUMENTS

| AU | 2006200842 | 7/2006 |
| AU | 2007200331 | 8/2007 |

(Continued)

OTHER PUBLICATIONS

"STEMCO Pro-Torq ® Advanced Axle Spindle Nuts 09-571-0006," Instruction guide, Copyright Aug. 2003, 2 pages.

(Continued)

*Primary Examiner* — Gary W Estremsky
(74) *Attorney, Agent, or Firm* — Heslin Rothenberg Farley & Mesiti PC; Kristian E. Ziegler, Esq.

(57) ABSTRACT

A lock nut system includes a nut having a retaining member which includes locking teeth configured to engage with the lock nut teeth. The retaining member is rotatable in both a clockwise or counterclockwise direction a preselected distance to allow the locking teeth to mesh with the nut teeth so the lock nut can be locked into position on the shaft without further rotation or other adjustment of the nut.

20 Claims, 11 Drawing Sheets

(56) References Cited

U.S. PATENT DOCUMENTS

| | | | |
|---|---|---|---|
| 1,755,807 | A | 4/1930 | Boles |
| 1,758,515 | A | 5/1930 | Heiermann |
| 1,813,640 | A | 7/1931 | Rossetti |
| 2,301,786 | A | 11/1942 | Millermaster |
| 2,426,219 | A | 8/1947 | Jackson |
| 2,532,141 | A | 11/1950 | Barkan et al. |
| 2,553,620 | A | 5/1951 | Yeazell |
| 2,755,698 | A | 7/1956 | Wurzel |
| 2,762,112 | A | 9/1956 | Kylen |
| 2,769,360 | A | 11/1956 | Cottrell |
| 2,813,732 | A | 11/1957 | Hird |
| 3,144,909 | A | 8/1964 | Hart et al. |
| 3,241,409 | A | 3/1966 | Raptis |
| 3,316,952 | A | 5/1967 | Hollinger |
| 3,390,445 | A | 7/1968 | Sova, Sr. |
| 3,464,474 | A | 9/1969 | Jansen |
| 3,480,300 | A | 11/1969 | Jeffrey et al. |
| 3,522,830 | A | 8/1970 | Blizard |
| 3,566,721 | A | 3/1971 | Nockleby |
| 3,581,609 | A * | 6/1971 | Greenwood .......... B25B 13/485 411/948 |
| 3,620,108 | A | 11/1971 | Door |
| 3,662,449 | A | 5/1972 | Hashimoto |
| 3,664,226 | A | 5/1972 | Gonzalez |
| 3,678,981 | A | 7/1972 | Heyworth |
| 3,705,524 | A | 12/1972 | Greenwood |
| 3,742,568 | A | 7/1973 | Hahlbeck |
| 3,762,455 | A | 10/1973 | Anderson, Jr. |
| 3,844,323 | A | 10/1974 | Anderson, Jr. |
| 3,986,750 | A | 10/1976 | Trent et al. |
| 4,004,338 | A | 1/1977 | Breitbach |
| 4,019,824 | A | 4/1977 | Percy |
| 4,048,897 | A | 9/1977 | Price, Jr. |
| 4,054,999 | A | 10/1977 | Harbottle |
| 4,210,372 | A | 7/1980 | McGee et al. |
| 4,305,438 | A | 12/1981 | Spinosa et al. |
| 4,436,468 | A | 3/1984 | Ozaki et al. |
| 4,476,750 | A | 10/1984 | Murphy |
| 4,593,924 | A | 6/1986 | Cabeza |
| 4,642,866 | A | 2/1987 | Murtaugh |
| 4,689,865 | A | 9/1987 | Chamblee |
| 4,812,094 | A | 3/1989 | Grube |
| 4,958,941 | A | 9/1990 | Imanari |
| 4,971,501 | A | 11/1990 | Chavez |
| 5,007,313 | A | 4/1991 | Jeromson, Jr. et al. |
| 5,011,306 | A | 4/1991 | Martinie |
| 5,058,424 | A | 10/1991 | O'Hara |
| 5,070,621 | A | 12/1991 | Butler et al. |
| 5,125,156 | A | 6/1992 | Witte |
| 5,129,156 | A | 7/1992 | Walker |
| 5,180,265 | A | 1/1993 | Wiese |
| 5,251,995 | A | 10/1993 | Chi |
| 5,348,349 | A | 9/1994 | Sloane |
| 5,349,736 | A | 9/1994 | Rubino et al. |
| 5,362,111 | A | 11/1994 | Harbin |
| 5,366,300 | A | 11/1994 | Deane et al. |
| 5,402,560 | A | 4/1995 | Rode |
| 5,442,854 | A | 8/1995 | Koltookian et al. |
| 5,533,849 | A | 7/1996 | Burdick |
| 5,535,517 | A | 7/1996 | Rode |
| 5,542,167 | A | 8/1996 | Nakamoto |
| 5,573,311 | A * | 11/1996 | Clohessy .............. F16C 35/063 301/124.1 |
| 5,597,058 | A | 1/1997 | Ewer |
| 5,749,386 | A | 5/1998 | Samuel, Jr. |
| 5,779,419 | A | 7/1998 | Kellström et al. |
| 5,877,433 | A | 3/1999 | Matsuzaki et al. |
| 5,882,044 | A | 3/1999 | Sloane |
| 5,934,853 | A | 8/1999 | Junkers |
| 6,042,273 | A | 3/2000 | Thrasher |
| 6,058,767 | A | 5/2000 | Calvin |
| 6,065,920 | A | 5/2000 | Becker et al. |
| 6,095,735 | A | 8/2000 | Weinstein et al. |
| 6,135,642 | A | 10/2000 | Burch |
| 6,145,417 | A | 11/2000 | Bates et al. |
| 6,186,032 | B1 | 2/2001 | Raines |
| 6,257,105 | B1 | 7/2001 | Lin |
| 6,286,374 | B1 | 9/2001 | Kudo et al. |
| D458,099 | S | 6/2002 | Ruszczyk |
| 6,415,489 | B1 | 7/2002 | Martins et al. |
| 6,471,774 | B1 | 10/2002 | Krueger |
| 6,520,710 | B2 | 2/2003 | Wells |
| 6,598,500 | B1 | 7/2003 | Chivington |
| 6,601,503 | B2 | 8/2003 | Scholzig et al. |
| 6,622,397 | B1 | 9/2003 | Knoble |
| 6,637,297 | B1 | 10/2003 | Mlynarczyk |
| 6,665,918 | B1 | 12/2003 | Williams |
| 6,736,544 | B1 | 5/2004 | DeWald |
| 6,749,386 | B2 | 6/2004 | Harris |
| 6,783,137 | B2 | 8/2004 | Nagreski et al. |
| 6,857,665 | B2 | 2/2005 | Vyse et al. |
| 6,886,227 | B1 | 5/2005 | Hedrick |
| 6,971,802 | B2 | 12/2005 | Vezina |
| 6,976,816 | B2 | 12/2005 | Slesinksi et al. |
| 6,976,817 | B1 | 12/2005 | Grainger |
| 6,983,677 | B1 | 1/2006 | Engel |
| 6,988,832 | B2 | 1/2006 | DeWachter et al. |
| 6,993,852 | B2 | 2/2006 | Russell et al. |
| 7,055,413 | B1 | 6/2006 | Wang |
| 7,194,936 | B2 | 3/2007 | Engel et al. |
| 7,226,259 | B2 | 6/2007 | Harris |
| 7,270,509 | B2 | 9/2007 | Disantis et al. |
| 7,303,367 | B2 | 12/2007 | Rode |
| 7,343,836 | B1 | 3/2008 | Ward |
| 7,346,985 | B1 | 3/2008 | Strait |
| 7,389,579 | B2 | 6/2008 | Rode |
| 7,428,779 | B2 | 9/2008 | Smith et al. |
| 7,448,301 | B1 | 11/2008 | Cronin |
| 7,559,135 | B2 | 7/2009 | Rode |
| 7,625,164 | B2 | 12/2009 | Rode |
| 7,757,586 | B2 | 7/2010 | Winker et al. |
| 7,927,052 | B1 | 4/2011 | Varden |
| 8,006,573 | B1 | 8/2011 | Rode |
| 8,016,531 | B2 | 9/2011 | White et al. |
| 8,172,496 | B2 | 5/2012 | Vile et al. |
| 8,292,373 | B2 | 10/2012 | Rieger et al. |
| 8,316,530 | B2 | 11/2012 | Rode |
| 8,328,486 | B2 | 12/2012 | Cox |
| 8,347,471 | B2 | 1/2013 | Wang |
| 8,359,733 | B2 | 1/2013 | Rode |
| 8,534,770 | B2 | 9/2013 | White |
| 8,650,757 | B2 | 2/2014 | Rode |
| D706,104 | S | 6/2014 | Mooney |
| 8,904,646 | B2 | 12/2014 | Rode |
| 8,919,227 | B2 | 12/2014 | Tseng |
| 8,961,090 | B2 | 2/2015 | Rode |
| 9,156,150 | B2 | 10/2015 | Wang |
| 9,200,672 | B2 | 12/2015 | Rode |
| 9,200,673 | B2 | 12/2015 | Rode |
| 9,217,461 | B2 | 12/2015 | Rode et al. |
| 9,566,699 | B1 | 2/2017 | Rode et al. |
| 9,574,612 | B2 | 2/2017 | Rode |
| 9,574,962 | B2 | 2/2017 | Preuss et al. |
| 9,587,667 | B2 | 3/2017 | Rode et al. |
| 9,599,164 | B1 | 3/2017 | Rode et al. |
| 9,618,049 | B2 | 4/2017 | Rode |
| 9,651,094 | B2 | 5/2017 | Rode |
| D789,169 | S | 6/2017 | Rode et al. |
| 9,764,453 | B1 | 9/2017 | Rode et al. |
| 9,797,441 | B2 | 10/2017 | Rode |
| 9,850,943 | B1 | 12/2017 | Rode |
| 9,909,609 | B2 | 3/2018 | Rode et al. |
| 2004/0089113 | A1 | 5/2004 | Morgan |
| 2006/0029485 | A1 | 2/2006 | Weinstein |
| 2006/0133909 | A1 | 6/2006 | Jimenez et al. |
| 2017/0268572 | A1 | 9/2017 | Rode et al. |
| 2017/0320203 | A1 | 11/2017 | Rode et al. |
| 2017/0326714 | A1 | 11/2017 | Rode et al. |
| 2018/0045244 | A1 | 2/2018 | Rode |
| 2020/0003249 | A1 | 1/2020 | Mesiti |

(56) References Cited

U.S. PATENT DOCUMENTS

FOREIGN PATENT DOCUMENTS

| | | |
|---|---|---|
| AU | 2007234534 | 12/2007 |
| AU | 2008201252 | 4/2008 |
| AU | 2011204889 | 8/2011 |
| CA | 2576337 | 7/2007 |
| CA | 2863789 | 7/2007 |
| CA | 2993836 | 7/2007 |
| CA | 2537611 | 8/2007 |
| CA | 2704865 | 12/2010 |
| CN | 102699875 | 10/2012 |
| DE | 555123 | 7/1932 |
| DE | 1962186 | 6/1970 |
| DE | 3905385 | 8/1990 |
| DE | 102007005160 | 8/2007 |
| DE | 102006011122 | 9/2007 |
| DE | 102010017610 | 3/2011 |
| EP | 1367299 | 12/2003 |
| EP | 3122512 | 2/2017 |
| GB | 990553 | 4/1965 |
| GB | 2286231 | 8/1995 |
| GB | 2434621 | 8/2007 |
| GB | 2435499 | 1/2008 |
| GB | 2445501 | 7/2008 |
| GB | 2471365 | 12/2010 |
| IT | 1401730 | 8/2013 |
| WO | 02/08618 | 1/2002 |
| WO | 2015/147903 | 10/2015 |

OTHER PUBLICATIONS

"Timkin Products-Bearings," vol. 1, Issue 6; entitled "Why Oscillate or Rotate a Bearing", 2 pages, [http://www. tmken.com/products/bearings/techtips/tip.asp].

Timkin Tech Tips: Promoting Safe, Proper Bearing Handling Practices for the Heavy-Duty Market; "Preload in Wheel Bearings" vol. 6, Issue 3, 2 pages, [http://www.Timkin.com/products/bearings/techtipsPDFs/vol6No3.pdf#search='Bearing%20Preloadl.

"Forming and Shaping Processes Compaction and Sintering (Pulvepresning)," Copyright Institut for Precesteknik Danmarks Tekniske Universitet 1996, (http://www.ipt.dtusdk/—ap/ingpro/ forming/ppm/htm).

Stemco, Pro-Torq, An Axle Spindle Nut System for Today's Fleets. Mar. 2003; download from hits://www.stemco.com, pp. 38-41.

Stemco, Pro-Torq, An Axle Spindle Nut System for Today's Fleets. Mar. 2003; download from http://www.stemco.com, pp. 57-64.

What is Powder Metallurgy? Dec. 2004, 2 pages, (https://www.mpiforg/technology/whatis.html).5011306.

Stemco, Quick Reference Catalog 572-0011 Rev. Date Apg. 2010.

Stemco—Pro-Torq, Axle Spindle Nuts, An Axle Spindle Nut System for Today's Commercial Fleets (http://www.stemco.com/product/pro-torz-axle-spindle-nuts/.

"Stemco Pro-Torq(R) 571-2970," Copyright 2005 Stemco LP, 2 pages.

International Search Report and Written Opinion from Corresponding PCT International Application No. PCT/US2014/050386 filed Aug. 8, 2015, completed and dated Dec. 26, 2014.

Search Report for related application GB0701360.0 dated Mar. 22, 2007.

Examiner's Report for related application AU2007200331 dated Mar. 19, 2007.

GB Intellectual Property Office Search Report Under Section 17, dated Aug. 25, 2010, from corresponding GB Application No. 1008927.4.

Rode, U.S. Appl. No. 15/671,604, filed Aug. 8, 2017.
Rode, U.S. Appl. No. 15/482,389, filed Apr. 7, 2017.
Rode, U.S. Appl. No. 15/482,395, filed Apr. 7, 2017.
Rode, U.S. Appl. No. 15/482,413, filed Apr. 7, 2017.
Rode, U.S. Appl. No. 15/813,889, filed Nov. 15, 2017.
Rode, U.S. Appl. No. 15/928,911, filed Mar. 22, 2018.
Rode, U.S. Appl. No. 16/058,561, filed Aug. 8, 2018.
Rode, et al., International PCT Application No. PCT/US2018/026525 filed on Apr. 6, 2018.

International Search Report and Written Opinion of the International Searching Authority for International PCT Application No. PCT/US2018/026525 dated Jul. 30, 2018.

Rode, U.S. Appl. No. 16/058,654, filed Aug. 8, 2018.

\* cited by examiner

LOCK NUT SYSTEMS AND METHODS

CROSS-REFERENCE TO RELATED APPLICATION

This application claims the benefit of and is a continuation of U.S. Non-provisional application Ser. No. 16/025,293, filed on Jul. 2, 2018, entitled Lock Nut with Rotatably Alignable Retaining Ring, the entire disclosure of which is hereby incorporated herein by reference.

TECHNICAL FIELD

This invention relates, generally, to fasteners, and more particularly, to lock nuts having retaining rings used for installing wheel hub and bearing assemblies on shafts such as axles or spindles, or for inhibiting relative movement of shafts engaged with such nuts. More particularly, this invention relates to a locknut with a rotatably alignable retaining ring which allows the lock nut to be locked into position without additional rotation thereto.

BACKGROUND ART

Lock nut systems are often connected to shafts and utilized to inhibit rotation of the retaining nut relative to such shafts. For example, such systems are often utilized on motor vehicles including axles and wheel ends. Typically, a lock nut will be engageable with a locking member or keeper which inhibits movement of the nut relative to the shaft. The locking member may include a protruding portion or key which extends into a slot or receiving portion of a shaft. The locking member may also engage the nut such that there is little or no movement between the nut and shaft.

In certain types of lock nuts the nut is locked into place on a shaft, such as an axle or spindle, by placing a retaining member into a recess within the nut. The retaining member, including a keeper connected to the retaining member may have a plurality of teeth which interlock with teeth of the nut. Also, the retaining member or keeper may have a protrusion such as a key which interlocks with the shaft. To lock the nut on the shaft the protrusion or key must interlock with the shaft while the teeth of the retaining member or keeper interlock with the teeth on the nut. Also, when the nut is threaded onto the shaft it may be tightened to a specified rotational position to maintain, for example, a specified torque, or a specified preload on the wheel end. However, when the nut is rotated to its specified position, the lock nut can be locked into position only if retaining member or keeper teeth will mesh with the nut teeth while the key interlocks with a slot on the shaft. If these conditions are not met, the nut may need to be further rotated after the nut is in its specified position to adjust the position of the nut teeth so that they mesh with the teeth of the retaining member or keeper while the protrusion or key interlocks with the shaft. The adjustment of the nut by such additional rotation will, however, change the torque (or preload) on the wheel end assembly. Such a change in torque (or preload) may not be desirable.

Thus, a need exists for lock nut systems which allow the retaining member to lock the nut into position without necessarily requiring additional rotation of the nut, and thus no significant change in the torque (or preload) applied to any assembly on the shaft during the installation process.

SUMMARY OF THE INVENTION

In accordance with the principles of the present invention, a lock nut system is provided which allows the lock nut to be mounted and tightened on a shaft to a specified position or torque and then locked into position by a retaining ring. The retaining ring is rotatable in the clockwise and counterclockwise direction a distance where locking teeth of the retaining ring are allowed to move in the clockwise and counterclockwise direction a distance corresponding to one half of the distance between identical locations on adjacent nut teeth. This allowed movement of the retaining ring allows the retaining ring to be able to be locked into position with the nut without additional rotation of the nut.

The lock nut system may include a nut having a plurality of nut teeth along an inner circumferential portion, where the nut is threadably engageable with a shaft, and a retaining member is engageable with the nut. The retaining member includes a keeper and a plurality of locking teeth configured to engage with the nut teeth. The keeper may be formed integral with the retaining member, or separate from the retaining member and affixed or engaged thereto. The keeper and/or retaining member includes a protrusion configured to fit within a recess of the shaft. The locking teeth are engageable with the nut teeth to lock the nut into position on the shaft when (i) the nut is threadably engaged to the shaft with the retaining member engaged to the nut and (ii) the protrusion is within the recess of the shaft. The protrusion and recess are configured relative to one another to allow the retaining member to rotate relative to the shaft, in both the clockwise and counterclockwise direction, a distance where the locking teeth are allowed to rotatably move one half of the distance between adjacent nut teeth when the protrusion is rotatably centered within the recess. The protrusion is rotatably centered within the recess when the retaining member can rotate equal distances in both the clockwise and counterclockwise direction.

The protrusion extends radially inward toward the central axis of the nut when the retaining member is engaged to the nut. The protrusion and recess are configured relative to one another so that the locking teeth are allowed to rotatably move a maximum distance of one half the distance between nut teeth. The maximum distance the locking teeth are allowed to rotatably move will still allow the nut to maintain a minimum preselected preload on one or more bearings mounted on the nut, and/or a minimum preselected torque on the shaft.

The nut may include at least one recess configured to receive the retaining member therein. The recess may be a circular recesses extending within an inside surface of the nut. The retaining member have at least one leg configured to be received in the circular recess. The at least one leg may be two legs elastically deformable toward one another to allow the retaining member to be engaged to the nut by inserting two legs in the circular recess. The retaining member may extend continuously in an arc when within the recess and engaged with the nut. The lock nut may be a bearing retaining nut.

In another aspect, a retaining apparatus for lock nut system useable with a nut having a plurality of nut teeth along an inner circumferential portion is provided, where the nut is threadably engagable with a shaft. The apparatus includes a retaining member engageable with the nut. The retaining member includes a keeper and a plurality of locking teeth configured to engage with the nut teeth. The keeper has a protrusion configured to fit within a recess of the shaft. The locking teeth are configured to engage with the nut teeth to lock the nut into position on the shaft when (i) the nut is threadably engaged to the shaft with the retaining member engaged to the nut and (ii) the protrusion is within the recess of the shaft. The protrusion and recess are configured relative to one another to allow the retaining member to rotate relative to the shaft, in both the clockwise and counterclockwise direction, a distance where the locking teeth are allowed to rotatably move one half of the distance between adjacent nut teeth when the protrusion is rotatably centered within the recess. The locking teeth rotatably move a maximum distance of one half the distance between nut teeth.

In another aspect, a method is provided. The method includes providing a retaining member engageable with a nut, the nut having a plurality of nut teeth along an inner circumferential portion and being threadable engageable with a shaft; configuring the retaining member with a keeper, the keeper comprising a protrusion sized to fit within a recess of the shaft and locking teeth. The locking teeth are engageable with the nut teeth to lock the nut into position on the shaft when (i) the nut is threadably engaged to the shaft with the retaining member engaged to the nut and (ii) the protrusion is within the recess of the shaft. The protrusion and recess are configured relative to one another to allow the retaining member to rotate relative to the shaft, in both the clockwise and counterclockwise direction, a distance where the locking teeth are allowed to rotatably move a distance of one half of the distance between adjacent nut teeth when the protrusion is rotatably centered within the recess. The maximum distance the retaining member can rotate in either direction corresponds to one half the distance between adjacent nut teeth.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

Lock nut systems may be used to retain wheel end assemblies onto a shaft such as an axle or spindle. Such lock nuts as disclosed in U.S. Pat. Nos. 8,961,090, 8,904,646, and 9,850,943, the specifications of which are incorporated herein by reference in their entireties, may use retaining members and/or keepers to lock the nut on a shaft. Such lock nut systems may be used to lock the nut onto a shaft at a specified rotational position to maintain a torque setting (or at a setting which maintains the wheel end assembly at a specified preload) where the specified setting of the nut is calculated to affect the wheel assembly including the bearings secured by the nut. Accordingly, when the nut is tightened to such specified setting, it is not desirable to further adjust, i.e. tighten or loosen the nut, as such movement may change the specified torque or preload setting. In prior lock nut systems which do not utilize the principles of the inventive concepts herein, in order to properly lock the nut, the retaining member key, must align with a recess such as for example a slot in the shaft. In addition, the teeth on the keeper must align with the teeth on the axle nut so that the teeth mesh and the retaining member can be properly inserted and locked to the nut. Such proper alignment can only occur if the aforementioned teeth are aligned and the retaining member is also aligned with the recess of the axle. However, frequently such alignment does not occur when the nut is tightened to its specified setting. In such prior situations and systems, in order to align the teeth of the nut and retaining member while the key is aligned with the slot of the nut, the nut must be either loosened or tightened so that the teeth of the nut align with the teeth of the keeper. Such further loosening or tightening may not be desired as it may change the torque and/or preload setting.

In accordance with the principles of the present invention, a lock nut system engageable with a shaft is provided. The nut may be locked onto the shaft without the aforementioned further loosening or tightening of the nut. Specifically, the system utilizes a rotatably alignable retaining member or ring. The retaining ring may be rotated in a clockwise direction, and a counterclockwise direction. A user may rotate the retaining member in either the clockwise or the counterclockwise direction to engage and lock the nut into place.

Figure 1A:
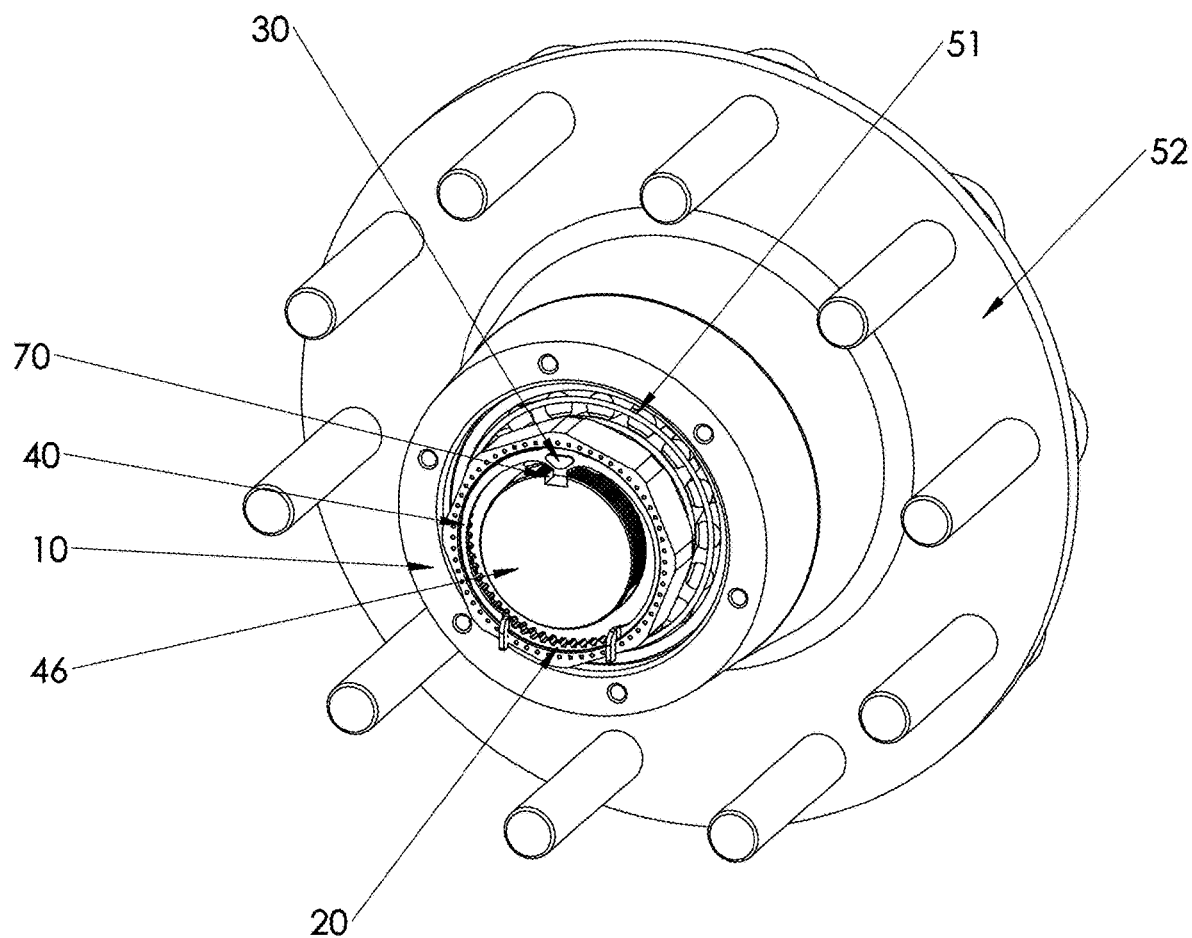
FIG. 1A is a perspective view of a lock nut system mounted on a shaft, such as an axle or spindle, to secure a wheel and bearing assembly thereon, which includes a lock nut having a keeper and a keeper retaining member engaged with the nut.
Figure 1B:
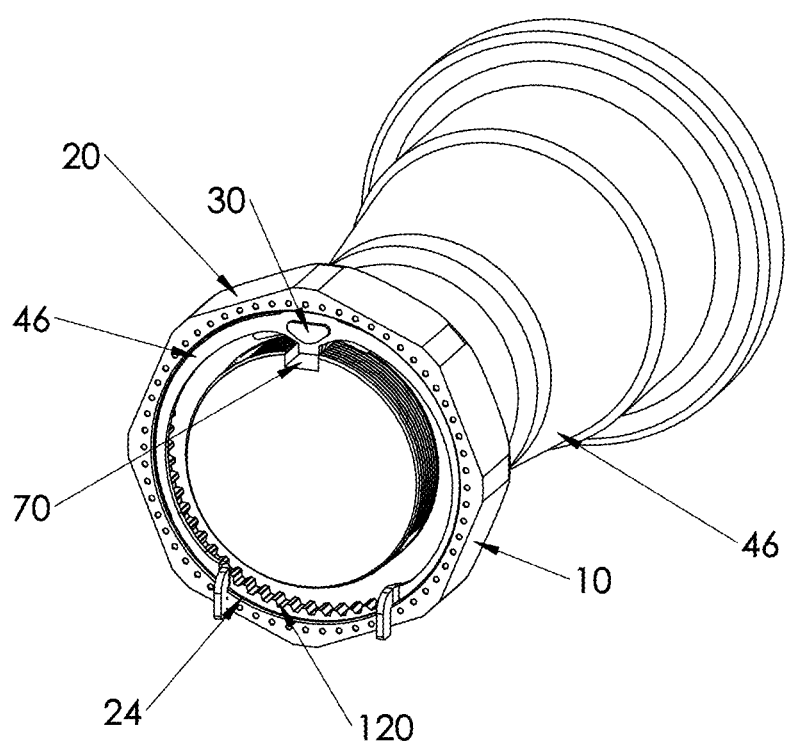
FIG. 1B is a perspective view of the lock nut system of FIG. 1A with the wheel and bearing assembly removed from the shaft.
Figure 1C:
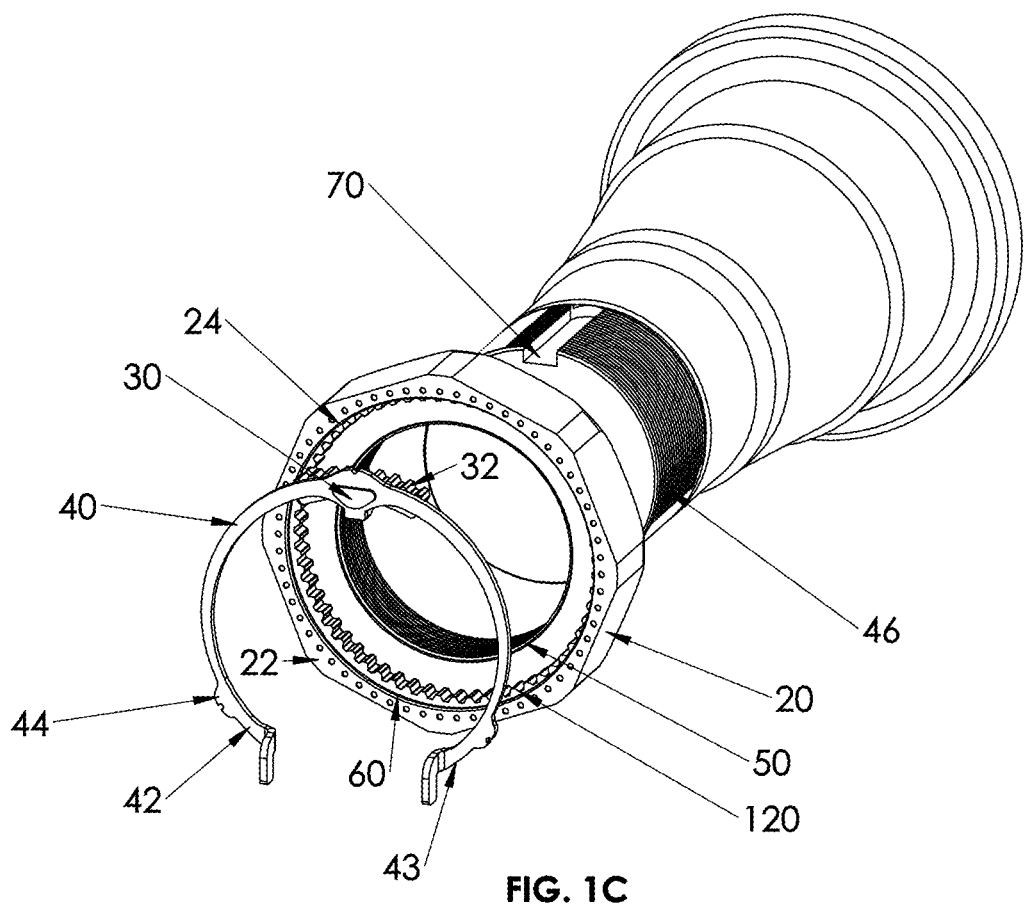
FIG. 1C is a perspective view of the lock nut system and shaft of FIGS. 1A and 1B, in a unassembled mode.

The lock nut system 10 and nut 20, as shown in FIG. 1A, often function as a bearing retaining nut to secure a bearing assembly 51 and wheel 52 on shaft 46, typically an axle or a spindle. FIGS. 1B and 1C depict where the wheel and bearing assembly have been removed for simplicity. Referring to FIGS. 1A-1C, the nut 20, in certain applications, is tightened to a desired position in order to impart a specified torque (or maintain a specified preload to a bearing and/or bearing assembly 51. For example, in certain applications, such as tractor or truck drive axles, the lock nut is specified to be tightened to approximately 500 foot pounds of torque so as to maintain such torque on the bearing of a bearing assembly 51 along with a wheel on an axle or spindle. In certain embodiments, the lock nut may include a recessed surface facing the bearing. However, in other embodiments and applications, a recessed surface is not included in the nut. The lock nut(s) shown in U.S. Pat. Nos. 8,961,090 and 8,904,646 are useable in connection with a retaining ring constructed in accordance with the invention. In certain applications, wheel end assemblies are adjusted to a preselected preload (or range of preload) setting during the installation process. Examples of techniques to adjust wheel end assemblies to a desired preload setting are set forth in U.S. Pat. No. 9,850,943, the specification of which is incorporated by reference herein. When the lock nut is tightened onto the shaft, the nut should be tightened to maintain the desired preload setting. Thus, when the nut is tightened to such a desired setting, if the nut teeth do not align with the keeper teeth (when the key is centered in the recess of the shaft), the nut may need to be adjusted, which may affect the preload.

In accordance with the principles of the present invention, in order to achieve alignment between the teeth 120 of the nut and the teeth 32 of the keeper without further rotation of the nut on the shaft, the system includes a rotatably adjustable or alignable retaining member 40. In this situation, the nut 20 need not be adjusted, by loosening or tightening in order to lock the retaining member 40 and keeper 30 into the lock nut 30. Thus, the specified torque of the nut when applied to the shaft may be maintained. Rather, the retaining ring 40 will fit into the lock nut, with either no rotation of the keeper 30 or slight rotation of the keeper 30 in either the clockwise or counterclockwise direction so that the nut teeth 120 engage with the keeper teeth 32, depending on the rotational position of the lock nut on the shaft.

In an exemplary embodiment, a lock nut system 10 includes a nut 20, a keeper 30 and a retaining member 40, as depicted in FIGS. 1A-1C. Lock nut system 10 may be useable on a shaft 46. In particular, threads 50 of nut 20 may engage threads of the shaft 46. Keeper 30 and retaining member 40 may engage nut 20 and keeper 30 may engage the shaft 46 to inhibit movement of the shaft relative to nut 20. The keeper may be formed integral with the retaining member, or separate from the retaining member and affixed or engaged thereto.

Figure 1D:
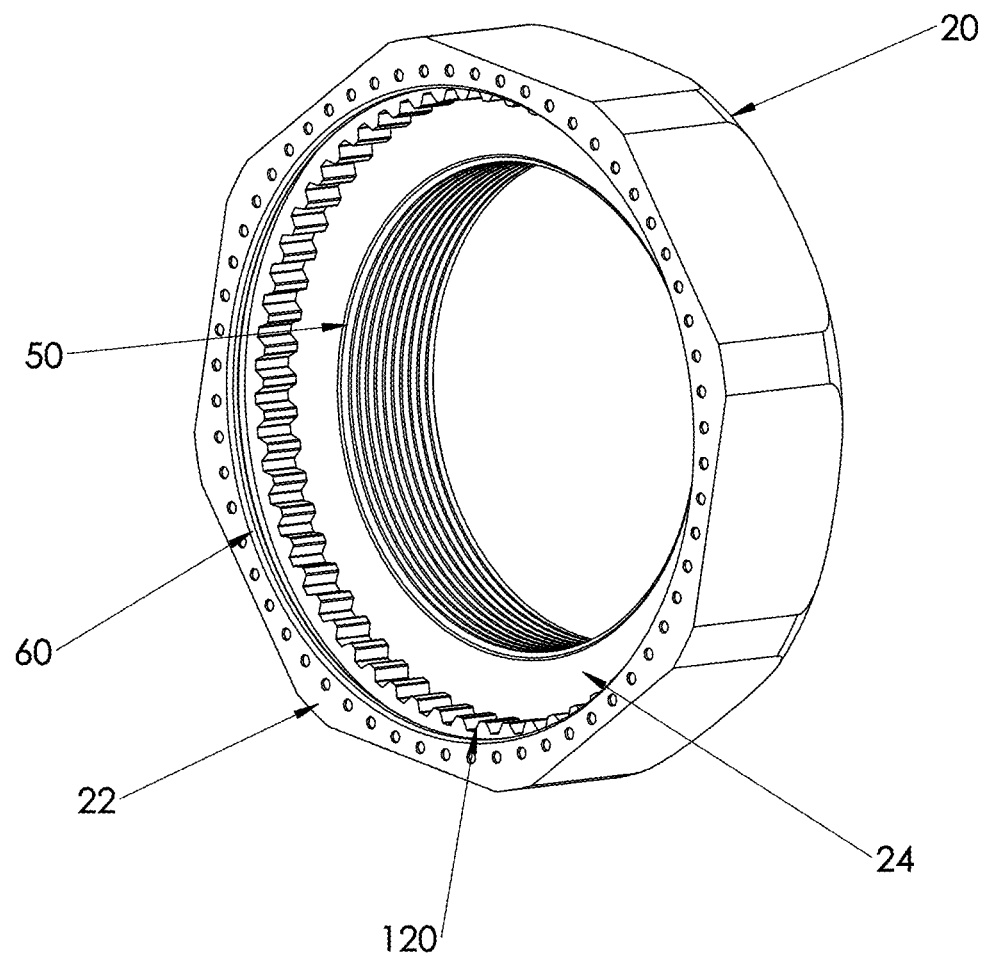
FIG. 1D is a perspective view of the lock nut of FIGS. 1A-1C without the retaining member and keeper.
Figure 1E:
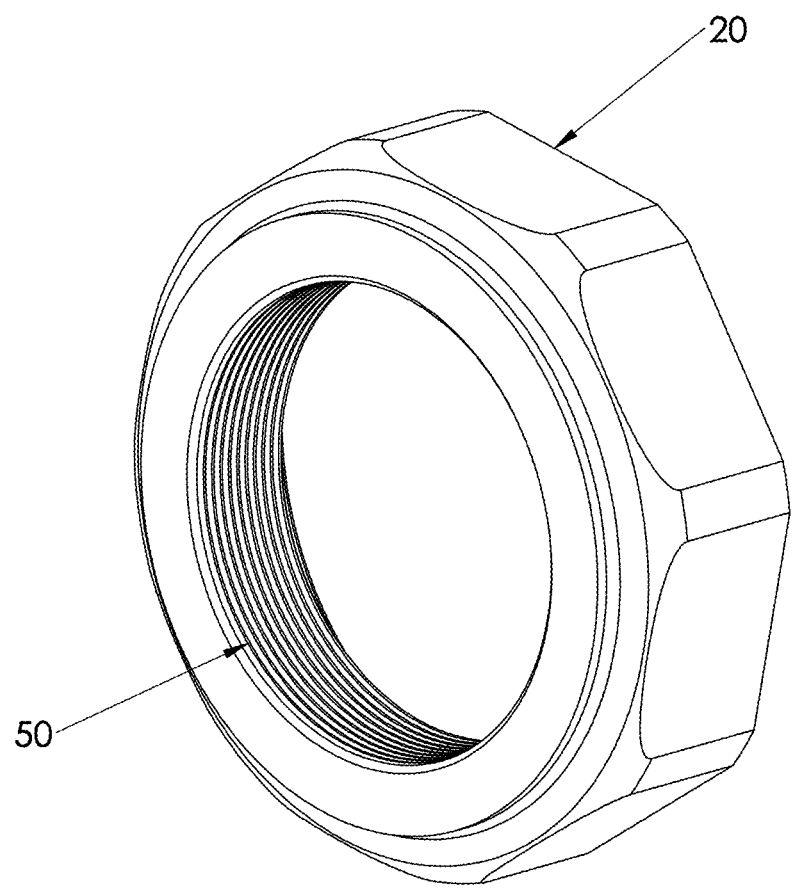
FIG. 1E is a perspective view of the opposite side of the nut of FIG. 1D.

Referring to FIGS. 1A-1E, nut 20 may include a plurality of nut engaging teeth 120 extending circumferentially around an inner radial surface of nut 20. For example, nut 20 may include 60 engaging teeth where the center of each tooth is separated by six degrees from the center of the next adjacent tooth. As shown in FIGS. 1B, 1C and 1D, nut 20 may also include a shoulder 24 configured to receive keeper 30. For example, shoulder 24 may extend circumferentially and face in the axial direction opposite the wheel bearing and assembly. The shoulder 24 may be spaced from an outer surface 22 of nut 20 in an axial direction relative to nut 20 such that keeper 30 is received between outer surface 22 and shoulder 24. Shoulder 24 may also abut and support keeper 30 in an axial direction. Nut 20 may be molded or formed of powdered metal, for example. As described below, shoulder 24 of the nut 20 may include a slot 60 to receive the retaining member 40.

Referring to FIG. 1D, nut 20 may include a slot 60 extending circumferentially (e.g., completely or partially) around nut 20. Slot 60 may be located between nut engaging teeth 120 and outer surface 22 of nut 20. Also, slot 60 may have a radial depth sufficient to receive and retain retaining member 40. Retaining member 40 may engage slot 60. For example, a first leg 42 and a second leg 43 may be received in slot 60. Further, a tab 44 of retaining member 40 (shown in FIGS. 1B and 1F) may be received in slot 60.

As shown in FIGS. 1C, and 3A-3C, keeper 30 of retaining member 40 may include a plurality of locking teeth 32 configured to engage nut teeth 120 of nut 20 such that movement between keeper 30 and nut 20 is inhibited when keeper locking teeth 32 and nut teeth 120 are engaged to each other, such as when the retaining member 40 and keeper 30 are locked onto the nut as shown in FIGS. 1A, 1B, 1F and 2B. Referring to FIGS. 1A-1C, 2A and 2B, retaining member 40 may include a shaft engaging side having, for example, a key 33 configured (e.g., shaped and dimensioned) to engage a shaft 46 by for example fitting within a recess such as, for example, a slot 70 on the shaft 46 to inhibit movement (e.g., rotational movement) of the shaft relative to keeper 30. When threads 50 of nut 20 engage threads of the shaft, keeper locking teeth 32 may engage nut engaging teeth 120, and keeper retaining member 40 may engage slot 60. For example, the engagement or meshing of keeper teeth 32 and nut engaging teeth 120 inhibits movement of keeper 30 relative to nut 20 and the engagement of engaging side 33 with the shaft inhibits movement between keeper 30 and the shaft thereby inhibiting movement between nut 20 and the shaft. Keeper 30 may include, for example, about seven keeper teeth 32 evenly spaced from one another, for example. Also, keeper teeth 30 on outer circumferential sides of keeper 30 may have an axial height (i.e., relative to nut 20) substantially equal to a distance from shoulder 24 to outer surface 22. Keeper teeth 32 on an inner portion of keeper 30 may have a height substantially equal to a distance from shoulder 24 to slot 60 thereby allowing one or more tabs 44 of retaining member 40 to extend into slot 60. More specifically, keeper locking teeth 32 on an inner portion have an axial height less than keeper teeth 32 on outer sides. The reduced axial height on inner portion allow tab 44 to pass over teeth 32 to extend into slot 60.

In a further unillustrated embodiment, keeper 30 could extend partially or entirely circumferentially around nut 20 (e.g., abutting shoulder 24) and could include keeper teeth 32 around an entire outer circumference of keeper 30, which therefore could engage some or all of engaging teeth 120.

Retaining member 40 may be elastically deformable to allow it to be received in slot 60. For example, first leg 42 and second leg 43 may be deformed (e.g., in a direction substantially perpendicular to the axis of nut 20) toward one another prior to being inserted axially past outer surface 22 of nut 20 to allow retaining member 40, and keeper 30 to be attached thereto. First leg 42 and second leg 43 may then be elastically returned toward slot 60. For example, retaining member 40 may be formed of ASTM A228 spring steel as will be understood by those skilled in the art. Also, retaining member 40 may be cylindrical or otherwise arcuately shaped. Alternatively, retaining member 40 could be formed of other materials and/or formed in other shapes to allow retaining member 40 to receive in slot 60 and/or cavities (e.g. cavity 36 and cavity 38) of keeper 30.

Retaining member 40 when received in slot 60 may align keeper 30 such that keeper teeth 32 are engaged with the nut teeth 120. Further, retaining member 40 when received in slot 60 provides resistance in an axial direction relative to nut 20 thereby inhibiting movement of keeper 30 axially away from shoulder 24 toward outer surface 22.

Figure 2A:
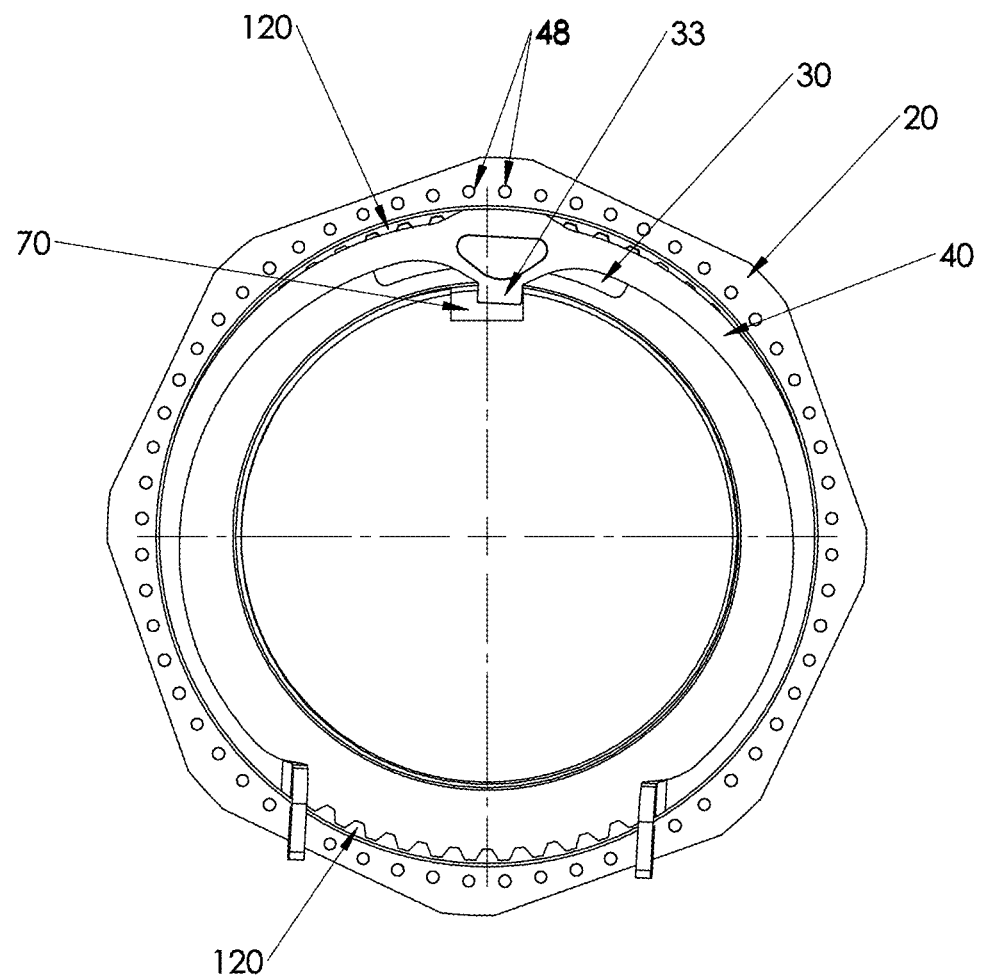
FIGS. 2A and 2B are front views of the lock nut system of FIG. 1A-1C with a rotatably alignable retaining member rotatably aligned and adjusted in the clockwise and counterclockwise directions, respectively.
Figure 2B:
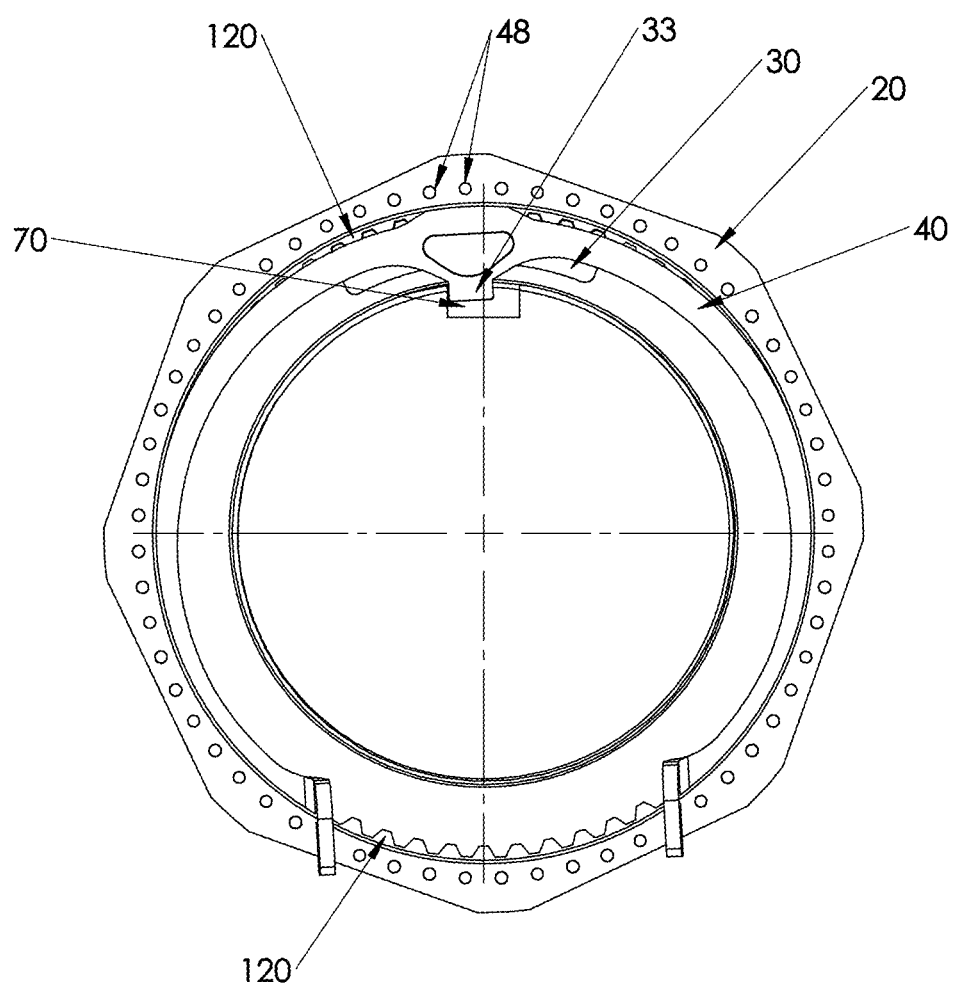
Figure 3A:
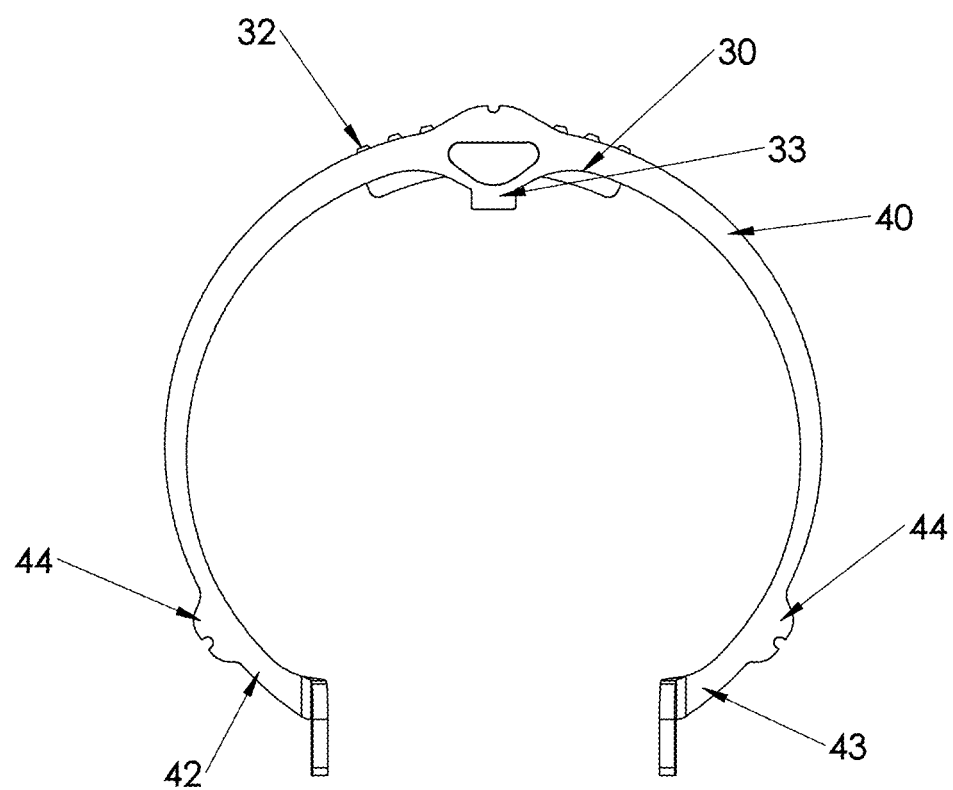
FIG. 3A-3C are front, back and side views, respectively, of the retaining member in accordance with one aspect of the invention.
Figure 3B:
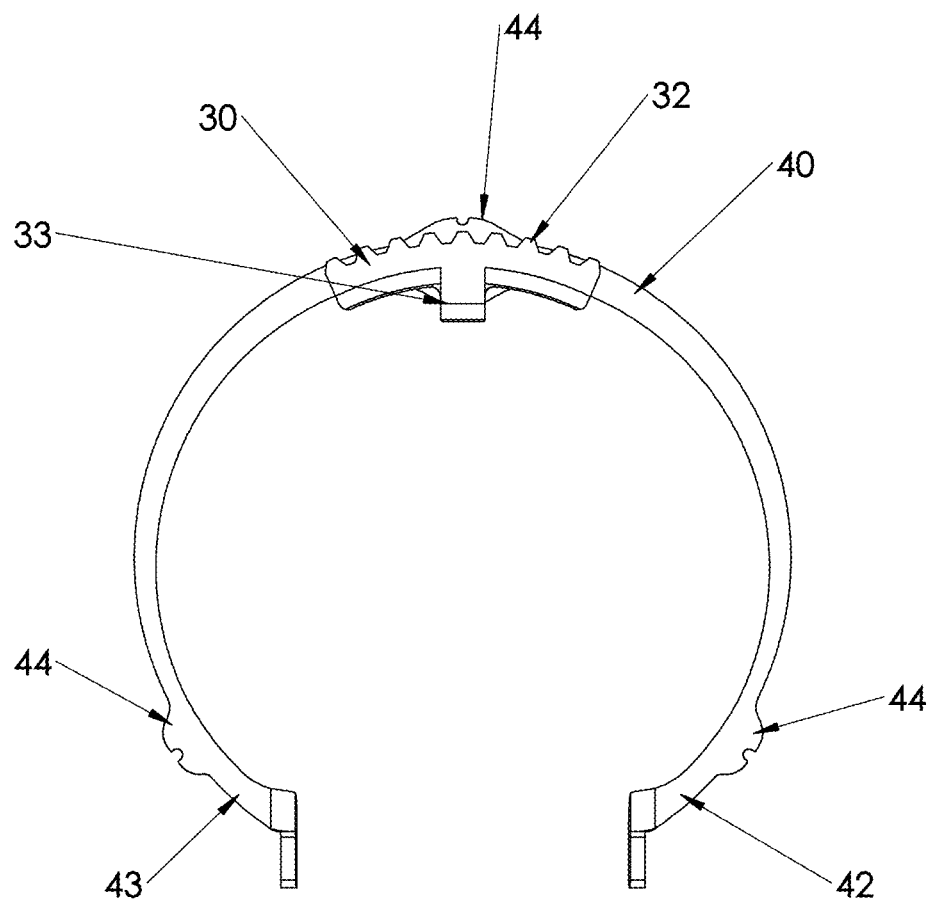
Figure 3C:
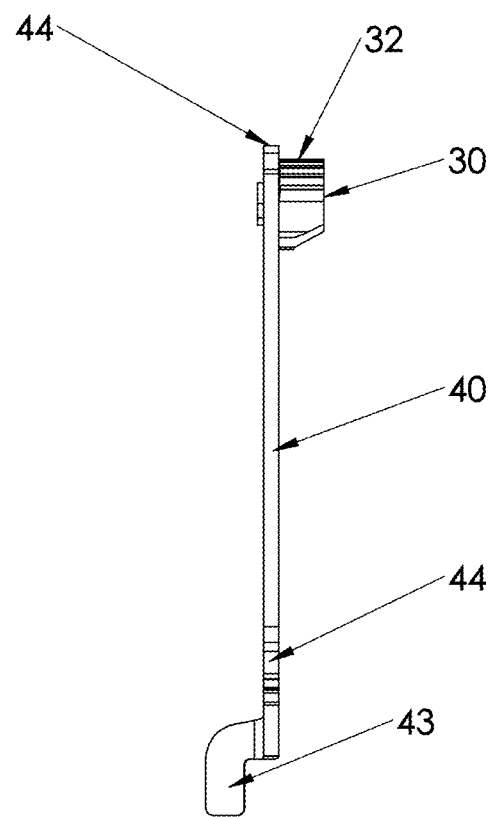

As shown in FIGS. 2A and 2B, keeper 30 functions to engage with the teeth 120 of the lock nut 20 so as to allow the retaining member 40 to fit into slot 60 of the nut and lock the nut 20 into position on the shaft 46. Further, keeper 30 may be formed or molded of powdered metal, for example. Also, keeper 30 could be formed in different shapes to allow it to engage a shaft to thereby inhibit movement of such shaft. For example, shafts may have different shaped recesses and the keeper 30 should be shaped so that its key 33, for example, fits within the recess to allow only relative rotation corresponding to ½ half of the distance between nut teeth (or keeper teeth if sized identical to the nut teeth) in both the clockwise and counterclockwise direction when the key 33 is rotatably centered within the recess.

Referring to FIG. 2A, the nut 20 is marked with a plurality of marks 48, which, for example, may be in the form of dots or any other form. The marks are equidistantly spaced on the outer surface of the nut to assist the user in determining if a clockwise adjustment or a counterclockwise adjustment should be made to the retaining member 40. In one embodiment, as shown, each mark 48 is located at a position on a radial line in the center of, and equidistant between, adjacent nut teeth 120. Also, each mark 48 is located at a position on a radial line extending from the center of the shaft to the middle of a gap between nut teeth 120, and in the middle of a radial line extending from the center of the shaft through the center of a corresponding locking tooth 32 which fits within such gap.

Figure 1F:
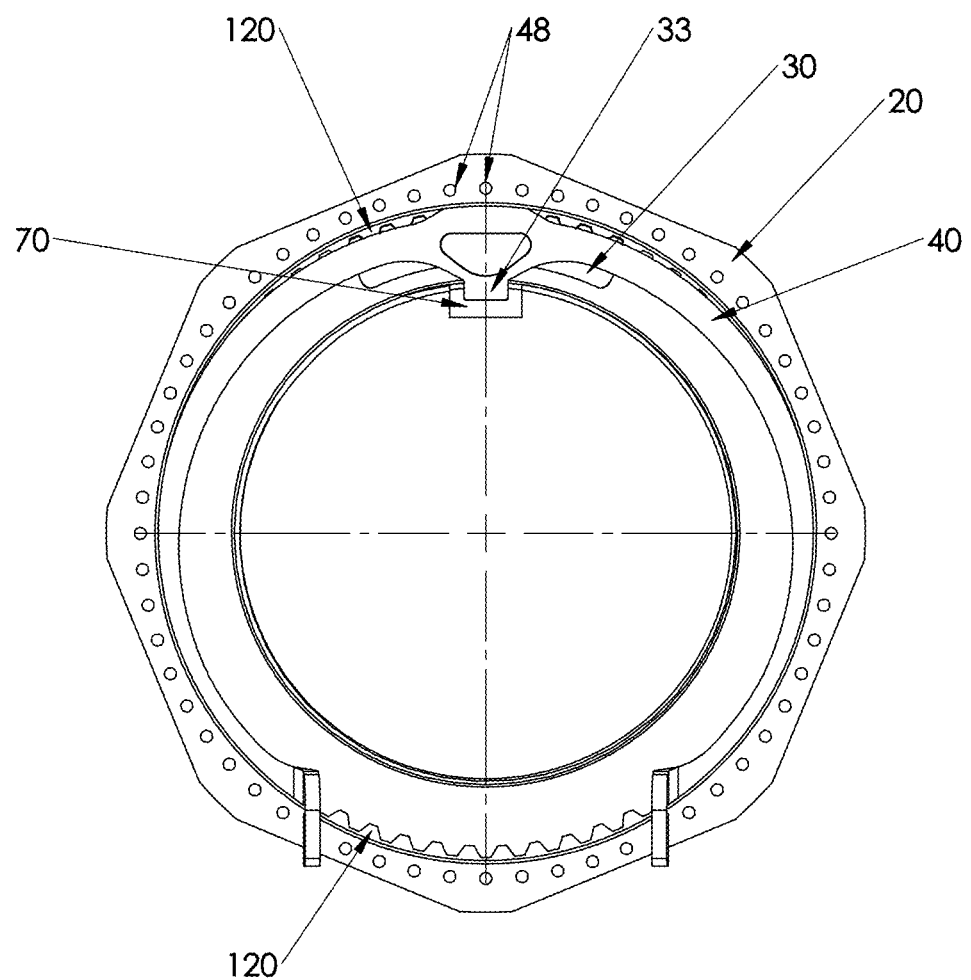
FIG. 1F is a front view of the lock nut system of FIGS. 1A-C with the retaining member key rotatably centered within the slot of the shaft where the key and slot are sized and configured in accordance with one aspect of the invention.

As shown in FIG. 1F, the key 33 of the retaining member is sized and configured in a particular manner with respect to slot 70 of the shaft. Specifically, the key 33 and slot 70 are configured so when the key 33 is rotatably centered within the slot 70 (as shown in FIG. 1F) the retaining member is allowed to rotate in the counterclockwise and clockwise direction a set distance corresponding to one-half of the distance between adjacent nut teeth 120. As referred to herein, the adjacent distance between nut teeth refers to the distance between identical locations of adjacent nut teeth. Thus, as shown in FIG. 1F, the distance between adjacent nut teeth is represented by the dots located around the circumference of the nut; the distance between each dot representing the distance between adjacent nut teeth.

As shown in FIG. 1F, 60 dots 48 are equally spaced along the circumference of the nut representing a distance of 6° of rotation therebetween. The width of the key 33 and the width of the slot 70 are configured to allow the key 33 and retaining member 40 to rotate in the counterclockwise and clockwise direction a distance of one-half of the distance between adjacent nut teeth 120 when the key 33 is centered within the slot 70. In the embodiment depicted in FIG. 1F, such distance corresponds to a 3° rotation of the retaining member 40 relative to the nut 20 in both the clockwise and counterclockwise direction. With this configuration, when the nut 20 is threadably mounted onto a shaft, the retaining member may be inserted into the nut 20 so that the key 32 is in the shaft slot 70 and the retaining member is locked into position with the nut by engaging the teeth therebetween irrespective of the rotational position of the nut. Thus, as shown in FIGS. 2A and 2B if the teeth 32 on the retaining member 40 do no align perfectly with the teeth on the nut, when the key 33 of the retaining member is centered within the slot 70, the retaining member 40 may be rotated in the clockwise and/or counterclockwise direction to have the nut teeth 120 engage within the retaining member teeth 32 while the protrusion or key 33 is in the slot 70. The maximum distance the retaining member 40 may rotate in either direction (when the key is centered within the slot 70) should be a distance where the retaining member teeth rotates one half the distance between adjacent nut teeth.

In order to allow the retaining member 40 to be rotated in either the clockwise or counterclockwise direction so that the nut teeth engage the retaining member teeth without further rotation of the nut on the shaft, the key 33 of the retaining member should be configured in a particular manner with regard to slot 70. For example, the key 33 should be sized so that it may rotate in the clockwise direction when inserted and centered within the slot 70 a distance which corresponds to the movement of the retaining member teeth in the clockwise direction a rotational distance corresponding to one-half of the distance between adjacent nut teeth. In addition, the key 33 should be sized relative to the slot 70 so that when the protrusion is within the slot, the retaining member may also rotate counterclockwise a distance wherein the corresponding movement of the retaining member teeth 32 will move counterclockwise a distance corresponding to one-half of the distance between adjacent nut teeth 120.

Accordingly, when the key 33 is aligned centrally within the slot 70 of the shaft, the distance between the left side of the key 33 and the left side surface of slot 70 is preferably equally distant to the distance between the right side of the key 33 and the right side surface of the slot 70. In addition, this equal and identical distance between respective sides of the key 33 and the slot 70 should correspond to the retaining member being able to move in either the counterclockwise or clockwise direction a distance corresponding to half the distance between adjacent nut teeth. By configuring the size of the key 33 and the slot 70 in this manner, when the retaining member 40 is inserted into the slot 60 of the nut 20 and the key 33 is inserted into the slot 70 of the shaft, if the retaining member teeth 32 do not align perfectly with the nut teeth 120, the retaining member may be rotated in one of the clockwise or counterclockwise directions to allow the nut teeth 120 to align and mesh with the retaining member teeth 32 while the key 33 still remains in the slot 70. In addition, by sizing the key 33 and the slot 70 as previously described, the retaining member should always be able to be adjusted by rotation in either the clockwise or counterclockwise direction to allow meshing of the nut teeth 120 with the retaining member teeth 32 because the maximum distance the retaining member teeth will need to move to align with the nut teeth will never be more than one-half the distance between adjacent nut teeth. Accordingly, the retaining member may be adjusted in one of the counterclockwise or clockwise directions any situation where the nut teeth do not align with the retaining member teeth, when the key 33 is centrally located within the slot 70 and the retaining member 40 is placed into the slot of nut 20 after the nut has been threaded onto the shaft 70, without further rotational adjustment of the nut on the shaft.

In addition, sizing and configuring the key 33 with the slot 70 as previously described, will result in the key 33 rotating a maximum distance in either the clockwise or counterclockwise direction where the key 33 contacts either side of slot 70. For example, if the retaining member 40 is rotated in the counterclockwise direction, its maximum distance corresponding to one-half the distance between adjacent nut teeth or (or retaining member teeth) in the counterclockwise direction, the key 33, and particularly the left side thereof, will contact the left side of slot 70. Also, if the retaining member 40 is rotated in the clockwise direction, its maximum distance corresponding to one-half the distance between adjacent nut teeth or (or retaining member teeth) in the clockwise direction, the key 33, and particularly the right side thereof, will contact the right side of slot 70.

If the retaining member 40 is adjusted in the counterclockwise direction, a maximum distance corresponding to one-half of the distance between adjacent nut teeth (or retaining member teeth) in the counterclockwise direction, it is possible that the nut (during operation of the vehicle or device upon which the nut is threaded to a shaft thereof) will loosen by rotating in the counterclockwise direction a slight distance where the key 33 will, after rotation, contact the side of slot 70. However, such slight rotation of the nut may be allowed without sacrificing the desired fit or tolerances of the assembly mounted on the shaft. Particularly, for example, in situations where a wheel hub and bearing assembly is mounted to the shaft to achieve a desired preload on the bearings and assembly, the slight rotation of the nut in the counterclockwise direction may be allowed while still maintaining the preload on the bearings and assembly within a minimum desired amount or range. For example, on 16 and 12 thread per inch lock nuts, the corresponding maximum loss of preload would be only about 150 and 180 pounds, respectively. Similarly, any loss in torque will also be minimal and the resulting torque will be within acceptable limits. Thus, even if the lock nut loosens, including to its maximum half tooth rotation, the nut can still maintain a minimum desired or preselected preload or torque on the assembly.

In accordance with the principles of the present invention, the axle nut 20 is installable on the shaft 46 using the following process. Lock nut 20, without retaining member 40 or keeper engaged thereto, is threadably mounted onto a shaft 46. The shaft will typically contain a wheel and bearing assembly thereon. If the lock nut is to be tightened to a desired torque, which may be specified by wheel end manufacturers or suppliers, the nut 20 is tightened to such torque. Typically, the range of torques specified for truck wheel ends ranges between 350 and 500 foot pounds. For different wheel end assemblies, manufacturers and suppliers may specify different lock nut installation and bearing setting procedures. Such procedures should be typically followed using the lock nut disclosed herein. Once such procedures are completed and the lock nut is tightened to a specified torque, the retaining member may be installed and assembled to be engaged into the lock nut. Also, bearing setting procedures to place the bearings and assemblies into a preload condition are often employed. The lock nut disclosed herein may be used to maintain the assembly and bearings within a desired preload range or at a desired preload.

As depicted in the figures herein, the legs 42, 43 of the lock nut may include openings for the use of retaining ring pliers to contract the radius or circumference of the ring. However, alternatively the legs may include tabs which allow the radius of the retaining member to be compressed by hand without the use of tools.

The retaining member 40 may be inserted into the slot 60 of the nut 20 with the protrusion 33 inserted into the recess 70 of the axle. With the protrusion 33 inserted into the axle recess 70 and the retaining member 40 placed into the lock nut 20 slot 60, the teeth 32 on the selected keeper may or may not align with the teeth 120 of the nut 20 such that the teeth 32 and 120 interlock or mesh with one another (as shown in FIG. 2A or 2B).

If the retaining member keeper teeth align properly and mesh with the nut teeth insertion of the retaining member 40 into the slot 60 of the nut will place the lock nut in the locked and assembled position, without rotation of the nut and disruption of the torque previously applied to the nut. However, if the teeth 32 of the keeper do not align with the teeth 120 of the nut such that the teeth do not mesh with one another, the retaining member may be rotated in the clockwise and/or counterclockwise direction to allow the teeth to mesh and to lock the lock nut into place. Also, it may be possible for the user to visually inspect the rotational position of the lock nut on the shaft to determine if the retaining member should be rotatably adjusted in the clockwise or counterclockwise direction. With this procedure, the nut need not be loosened or tightened in order to align the teeth of the keeper 32 with the teeth of the teeth 120 of the nut 20. Accordingly, with this procedure the nut need not be further adjusted to be locked into place on the shaft so there is no adjustment or change in the torque applied by the nut onto the wheel end and/or bearing assembly.

Use of molded metals (e.g., powdered metal) as described above for the nuts and keepers allows a finer spacing of teeth than other materials (e.g., sheet metal keepers) and methods thereby allowing finer adjustment of nuts, keepers, and shafts relative to each other, while preventing or inhibiting movement of the keeper relative to the nuts. For example, the use of powdered metal instead of stamped sheet metal for a keeper allows a higher number of keeper teeth to be provided per unit area thereby allowing more engagement with corresponding engagement teeth on the nut. The ability of the molded teeth in the present invention to resist torque is significantly higher than that afforded by a stamped part of previous inventions because of the ability to economically mold teeth with greater axial dimensions as well as the ability to include a greater number of engaging teeth per unit area, when using powdered metal instead of stamped sheet metal. A finer adjustment may therefore be provided of the keeper relative to the nut due to such increased number of keeper teeth and corresponding increased number of engaging teeth of a nut per unit area. For example, a finer adjustment of bearing clearance can be achieved with the use of the finer pitch of the molded teeth. Further, the use of molded metals (e.g., powdered metals) for keeper 30 allows it to engage a shaft without being significantly deformed or significantly deforming the shaft in contrast to other materials used for this purpose (e.g., stamped sheet metal) which may deform after a period in use or cause deformation (e.g., stripped threads) of a shaft to which it is engaged. Additionally, such a molded keeper may be harder and stronger than a stamped sheet metal keeper thereby inhibiting such damage. Thus, a higher torque loading may be provided utilizing molded metals (e.g., powdered metal) relative to other materials (e.g., a sheet metal stamped keeper) to form keepers and nuts and without resulting in failure, i.e., a risk of damage to the shaft or axle due to over torque is minimized. Also, keepers may resist deformation when engaged with a slot of a shaft for the same reasons.

Although the above-described lock nuts and keepers are described as being molded or formed of powdered metal, these nuts and keepers could be die cast, molded of other materials, or formed in any other manner which would allow the teeth of the keeper and nut to inhibit movement relative to each other along with the keeper and shaft inhibiting movement relative to one another. Also, the retaining member could be formed of sheet metals or the same materials as the keepers and/or nuts. Such retaining members could also be formed of plastic or any other material which would axially hold a keeper (e.g., keeper 30) such that the keeper teeth thereof (e.g., keeper teeth 32) are engaged with nut engaging teeth (e.g., engaging teeth 120) of a nut (e.g., nut 20). For example, such retaining members could be formed of plastics which satisfy this criteria.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A lock nut system, comprising:
   a nut having a plurality of nut teeth along an inner circumferential portion, said nut being configured to threadably engage with an axle or spindle and to maintain a bearing and wheel assembly on the axle or spindle and to maintain the bearing in a predefined condition during use;
   a retaining member engageable with the nut, the retaining member including a keeper and a plurality of locking teeth configured to engage with said plurality of nut teeth, said keeper having a protrusion configured to fit within a recess of said axle or spindle, said locking teeth being configured to engage with said
nut teeth to lock said nut into position on said axle or
spindle when (i) the nut is threadably engaged to the
axle or spindle with the retaining member engaged to
the nut and (ii) the protrusion is within the recess of the
axle or spindle, and wherein said protrusion and recess are configured relative
to one another to allow the retaining member to rotate
relative to the axle or spindle in a clockwise or counterclockwise direction a distance where the locking
teeth are allowed to rotatably move a maximum distance of one half of the distance between adjacent nut
teeth when the protrusion is centered within the recess.

2. The lock nut system of claim 1, wherein said protrusion extends radially inward toward the central axis of said nut when said retaining member is engaged to said nut.

3. The lock nut system of claim 1, wherein the nut and the retaining member are configured such that the predefined condition comprises a minimum preload condition.

4. The lock nut system of claim 1, wherein the inner circumferential portion includes a slot and an internally threaded portion, the internally threaded portion being configured to threadably engage with the axle or spindle, wherein the retaining member includes a retaining portion engaged within the slot, and wherein the plurality of nut teeth are positioned axially between the slot and the threaded portion.

5. The lock nut system of claim 4, wherein the retaining member extends continuously in an arc within said slot.

6. The lock nut system of claim 4, wherein the retaining member comprises at least one leg portion within said slot.

7. The lock nut system of claim 6, wherein said at least one leg comprises two legs elastically deformable toward one another to allow said retaining member to be engaged to said nut by inserting said two legs in said slot.

8. The lock nut system as recited in claim 4, wherein the retaining portion is formed of a first metal material and the protrusion is formed of a second metal material that differs from the first metal material.

9. The lock nut system as recited in claim 4, wherein the retaining portion and the protrusion comprise different components that are coupled together.

10. The lock nut system as recited in claim 1, wherein the axle or spindle comprises a truck axle or spindle, including at least a tractor trailer truck axle or spindle.

11. A lock nut system, comprising:
a nut having a plurality of nut teeth along an inner circumferential portion, said nut being configured to threadably engage with an axle or spindle and to maintain a bearing and wheel assembly on the axle or spindle and to maintain the bearing in a predefined condition during use;
a retaining member engageable with the nut, the retaining member including a keeper and a plurality of locking teeth configured to engage with said plurality of nut teeth, said keeper having a protrusion configured to fit within a recess of said axle or spindle,
said locking teeth being configured to engage with said nut teeth to lock said nut into position on said axle or spindle when (i) the nut is threadably engaged to the axle or spindle with the retaining member engaged to the nut and (ii) the protrusion is within the recess of the axle or spindle,
wherein said protrusion and recess are configured relative to one another to allow the retaining member to rotate relative to the axle or spindle in a clockwise or counterclockwise direction a distance where the locking teeth are allowed to rotatably move one half of the distance between adjacent nut teeth when the protrusion is within the recess, and
wherein the protrusion and the recess are rectangular.

12. The lock nut system of claim 11, wherein the protrusion and the recess are configured relative to one another so that the locking teeth are allowed to rotatably move a maximum distance of one half the distance between nut teeth when the protrusion is centered within the recess.

13. A lock nut system, comprising:
a nut having a plurality of nut teeth along an inner circumferential portion, said nut being configured to threadably engage with an axle or spindle and to maintain a bearing and wheel assembly on the axle or spindle and to maintain the bearing in a predefined condition during use;
a retaining member engageable with the nut, the retaining member including a keeper and a plurality of locking teeth configured to engage with said plurality of nut teeth, said keeper having a protrusion configured to fit within a recess of said axle or spindle,
said locking teeth being configured to engage with said nut teeth to lock said nut into position on said axle or spindle when (i) the nut is threadably engaged to the axle or spindle with the retaining member engaged to the nut and (ii) the protrusion is within the recess of the axle or spindle,
wherein said protrusion and recess are configured relative to one another to allow the retaining member to rotate relative to the axle or spindle in a clockwise or counterclockwise direction a distance where the locking teeth are allowed to rotatably move one half of the distance between adjacent nut teeth when the protrusion is within the recess,
wherein the inner circumferential portion includes a slot and an internally threaded portion, the internally threaded portion being configured to threadably engage with the axle or spindle,
wherein the retaining member includes a retaining portion engaged within the slot, and
wherein the plurality of nut teeth are positioned axially between the slot and the threaded portion.

14. A method of maintaining a bearing and wheel assembly on an axle or spindle, comprising:
threadably coupling a lock nut system on the axle or spindle to maintain the bearing in a particular condition during use, comprising:
threadably coupling a nut having a plurality of nut teeth along an inner circumferential portion onto the axle or spindle; and
engaging a retaining member with the nut that includes a keeper and a plurality of locking teeth such that the plurality of locking teeth engage with said plurality of nut teeth and a protrusion of the said keeper is positioned within a recess of said axle or spindle,
wherein the locking teeth lock said nut into a position on said axle or spindle, and
wherein said protrusion and recess are configured relative to one another to allow the retaining member to rotate relative to the axle or spindle in a clockwise or counterclockwise direction a distance where the locking teeth are allowed to rotatably move a maximum distance of one half of the distance between adjacent nut teeth when the protrusion is centered within the recess.

15. The method of claim 14, wherein the nut and the retaining member are configured such that the particular condition comprises a minimum preload condition.

16. The method of claim 14, wherein engaging the retaining member with the nut comprises positioning the retaining member within a slot in the inner circumferential portion.

17. The method of claim 14, wherein the axle or spindle comprises a truck axle or spindle, including at least a tractor trailer truck axle or spindle.

18. The method of claim 14, wherein threadably coupling the nut onto the axle or spindle comprises threadably coupling a threaded portion of the inner circumferential portion on the axle or spindle, wherein the engaging the retaining member with the nut comprises positioning a portion of the retaining member within a slot in the inner circumferential portion, and wherein the plurality of nut teeth are positioned axially between the slot and the threaded portion.

19. A method of maintaining a bearing and wheel assembly on an axle or spindle, comprising:
 threadably coupling a lock nut system on the axle or spindle to maintain the bearing in a particular condition during use, comprising:
  threadably coupling a nut having a plurality of nut teeth along an inner circumferential portion onto the axle or spindle; and
  engaging a retaining member with the nut that includes a keeper and a plurality of locking teeth such that the plurality of locking teeth engage with said plurality of nut teeth, a protrusion of the said keeper is positioned within a recess of said axle or spindle, and a portion of the retaining member is positioned within a slot in the inner circumferential portion,
 wherein the locking teeth lock said nut into a position on said axle or spindle, and
 wherein said protrusion and recess are configured relative to one another to allow the retaining member to rotate relative to the axle or spindle in a clockwise or counterclockwise direction a distance where the locking teeth are allowed to rotatably move one half of the distance between adjacent nut teeth, and
 wherein threadably coupling the nut onto the axle or spindle comprises threadably coupling a threaded portion of the inner circumferential portion on the axle or spindle, and wherein the plurality of nut teeth are positioned axially between the slot and the threaded portion.

20. The method of claim 19, wherein the protrusion and the recess are configured relative to one another so that the locking teeth are allowed to rotatably move a maximum distance of one half the distance between nut teeth when the protrusion is centered within the recess.

* * * * *